United States Patent [19]

Stevens

[11] Patent Number: 5,018,471
[45] Date of Patent: May 28, 1991

[54] MARINE FENDER FOR PILINGS OF MARINE STRUCTURES

[76] Inventor: William E. Stevens, Rte. 6, Box 90, Elizabeth City, N.C. 27909

[21] Appl. No.: 295,299

[22] Filed: Jan. 10, 1989

[51] Int. Cl.⁵ .............................................. E02B 3/22
[52] U.S. Cl. .................................. 114/219; 405/212; 405/215
[58] Field of Search ............................ 114/218–220, 114/264–267, 343; 405/211–216; D12/168, 167, 317, 318

[56] References Cited

U.S. PATENT DOCUMENTS

| | | | |
|---|---|---|---|
| 3,372,552 | 3/1968 | Liddell | 405/215 |
| 3,411,304 | 11/1968 | Miller | 405/215 |
| 3,540,403 | 11/1970 | Russell | 114/219 |
| 3,584,464 | 6/1971 | Saadeh | 405/215 |
| 4,005,672 | 2/1977 | Files | 405/215 |
| 4,351,257 | 9/1982 | Brown | 114/219 |
| 4,497,593 | 2/1985 | Kramer | 405/215 |
| 4,751,891 | 6/1988 | Wilson | 405/215 |

FOREIGN PATENT DOCUMENTS 975876 11/1982 U.S.S.R. ............................... 405/215

Primary Examiner—Joseph F. Peters, Jr.
Assistant Examiner—Clifford T. Bartz
Attorney, Agent, or Firm—Shefte, Pinckney & Sawyer

[57] ABSTRACT

A resilient marine fender for protecting a boat from damage resulting from impact against a boat dock, piling or other marine structure includes a fender body having an elongate bumper portion on one side of sufficient resiliency to cushion normal impact of the boat and mounting surface on the opposite side thereof of sufficiently frictional character with respect to the piling for generally non-slipping engagement therewith. Selectively engagable and disengagable strap means at the lateral sides of the fender body encircle the pilling for selectively securing the fender body to the piling such that the mounting surface is held in frictional facing contact against the piling. A number of elongate bumper portions can be disposed in side-by-side relation to one another on the fender body and a plurality of strap assemblies can be provided.

10 Claims, 3 Drawing Sheets

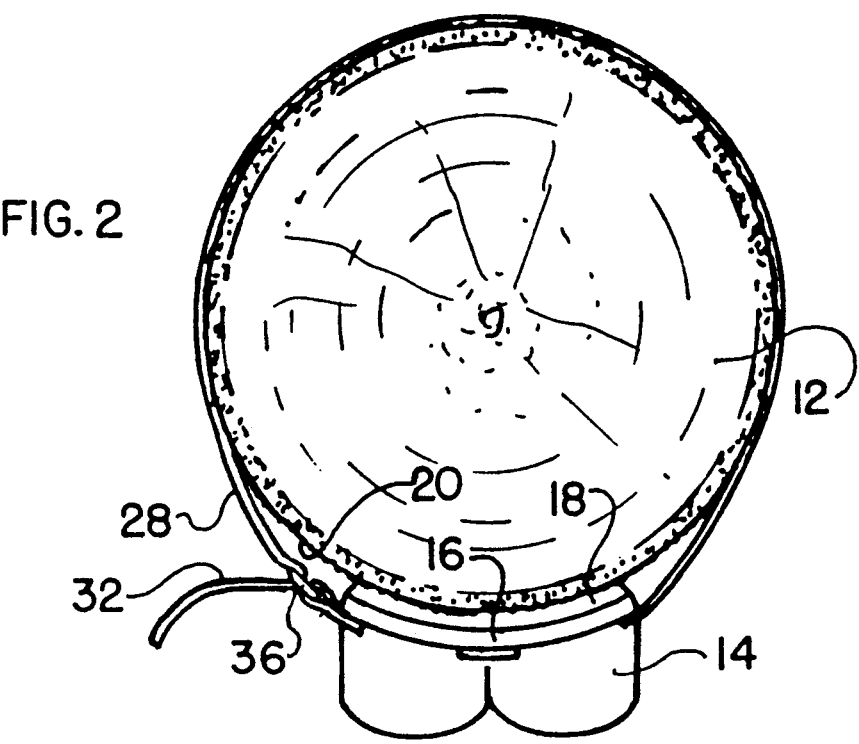

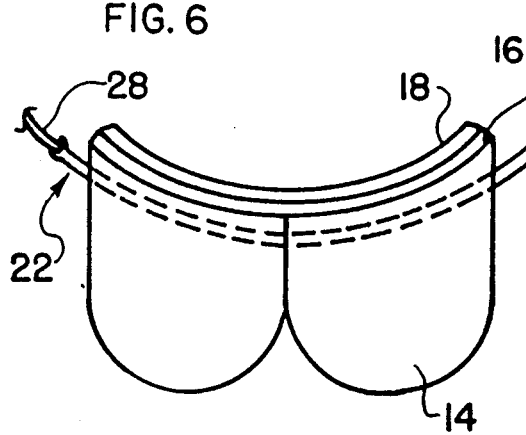
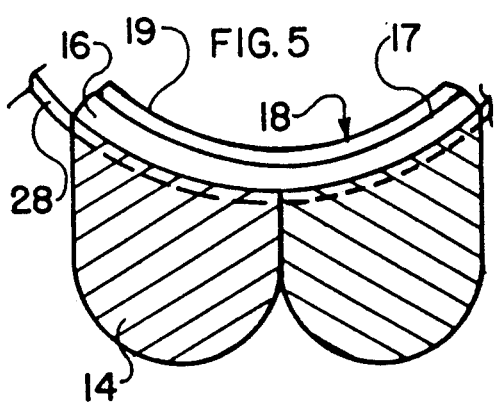
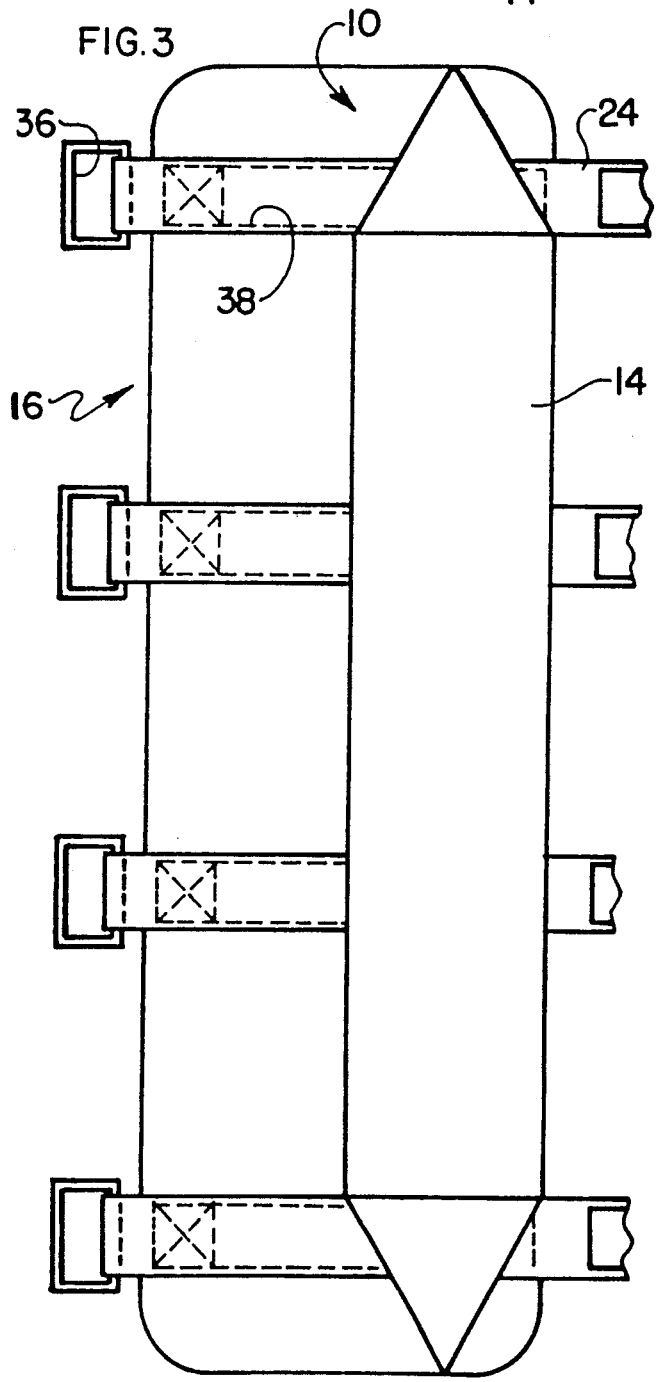
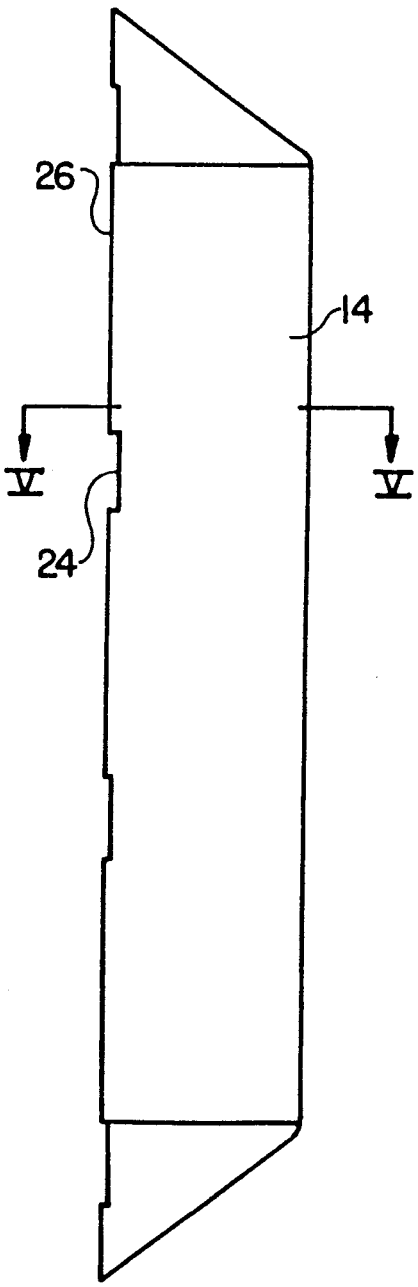

MARINE FENDER FOR PILINGS OF MARINE STRUCTURES

BACKGROUND OF THE INVENTION

The present invention relates to a resilient marine fender for protecting a boat or other marine vessel or craft from damage resulting from impact against a marine structure such as a boat dock, pier or like marine structure.

To cushion small marine craft, such as motorized pleasure and fishing boats, from the impact forces resulting from contact with fixed marine structures such as the pilings of piers and docks to which such vessels are commonly secured when docked, the owners and operators of such vessels commonly follow the practice of securing an impact absorbing material to the side of their crafts which would be compressed between the craft and the other structure and thus cushion the craft from the impact forces. For example, U.S. Pat. No. 3,540,403 to Russell discloses a marine bumper having an interconnected pair of hollow deformable bodies which can be tied to a marine craft.

The need for cushioning the marine craft and the structures to which they dock from detrimental impact forces has also given rise to protective structures adapted to be mounted on the docks or marine structures themselves. For example, U.S. Pat. No. 4,351,257 to Brown, Jr., discloses a more structurally substantial marine fender adapted for absorbing relatively large amounts of energy upon repeated compression for use, for example, on oceanic marine structures, such as on an off shore oil platform for use in cushioning large ocean going vessels even under relatively severe conditions.

The Russell patent also discloses the possible use of the bumper disclosed therein for mounting around a marine piling. However, unless such cushioning structures are permanently or rigidly secured in place on the marine structure, such as by chaining as shown in the Brown, Jr., patent, the cushioning structure will be subject to displacement from its desired disposition on the marine structure as a result of the very contact with a marine vessel for which the cushioning structure is intended.

SUMMARY OF THE INVENTION

It is accordingly an object of the present invention to provide a marine fender which can be quickly and reliably secured to and removed from a marine structure such as a piling and which maintains its desired position when secured on the piling even after repeated contact by marine craft.

Briefly described, the present invention provides a marine fender adapted to be selectively affixed to and removed from an elongate piling of a marine structure for protecting marine vessels and the piling from damaging contact with one another, the fender including a fender body having an elongate bumper portion at one side of the body of sufficient resiliency to cushion normal impact of a marine vessel with a piling as a result of marine wave action and having a mounting surface at the opposite side of the body of sufficiently frictional character with respect to a piling for generally non-slipping engagement therewith, the body being sufficiently manipulable in its lateral extent transversely of the longitudinal extent of the bumper portions to be generally conformable to the cross-sectional shape of a piling and selectively engagable and disengagable strap means at the lateral sides of the fender body for encircling a piling for selectively securing the body to a piling with the elongate extents of the bumper portion and the piling generally parallel and with the mounting surface held in frictional facing contact against the piling. Preferably, the marine fender includes a plurality of bumper portions disposed in substantially side-by-side relation to one another. Preferably, the strap means includes a plurality of strap assemblies, each strap assembly having a strap of sufficient length to encircle the piling.

BRIEF DESCRIPTION OF THE DRAWINGS

FIG. 2 is a top view of the marine fender and the piling shown in FIG. 1;

FIG. 3 is a front elevational view of the marine fender of FIGS. 1 and 2, showing one bumper portion of the fender removed;

FIG. 4 is a side view of one bumper portion of the fenders of FIGS. 1–3;

FIG. 5 is a top view of the marine fender of FIGS. 1–4 taken along line V—V in FIG. 4; and FIG. 6 is a top view of another embodiment of the marine fender of the present invention.

DETAILED DESCRIPTION OF THE PREFERRED EMBODIMENTS

Figure 1:
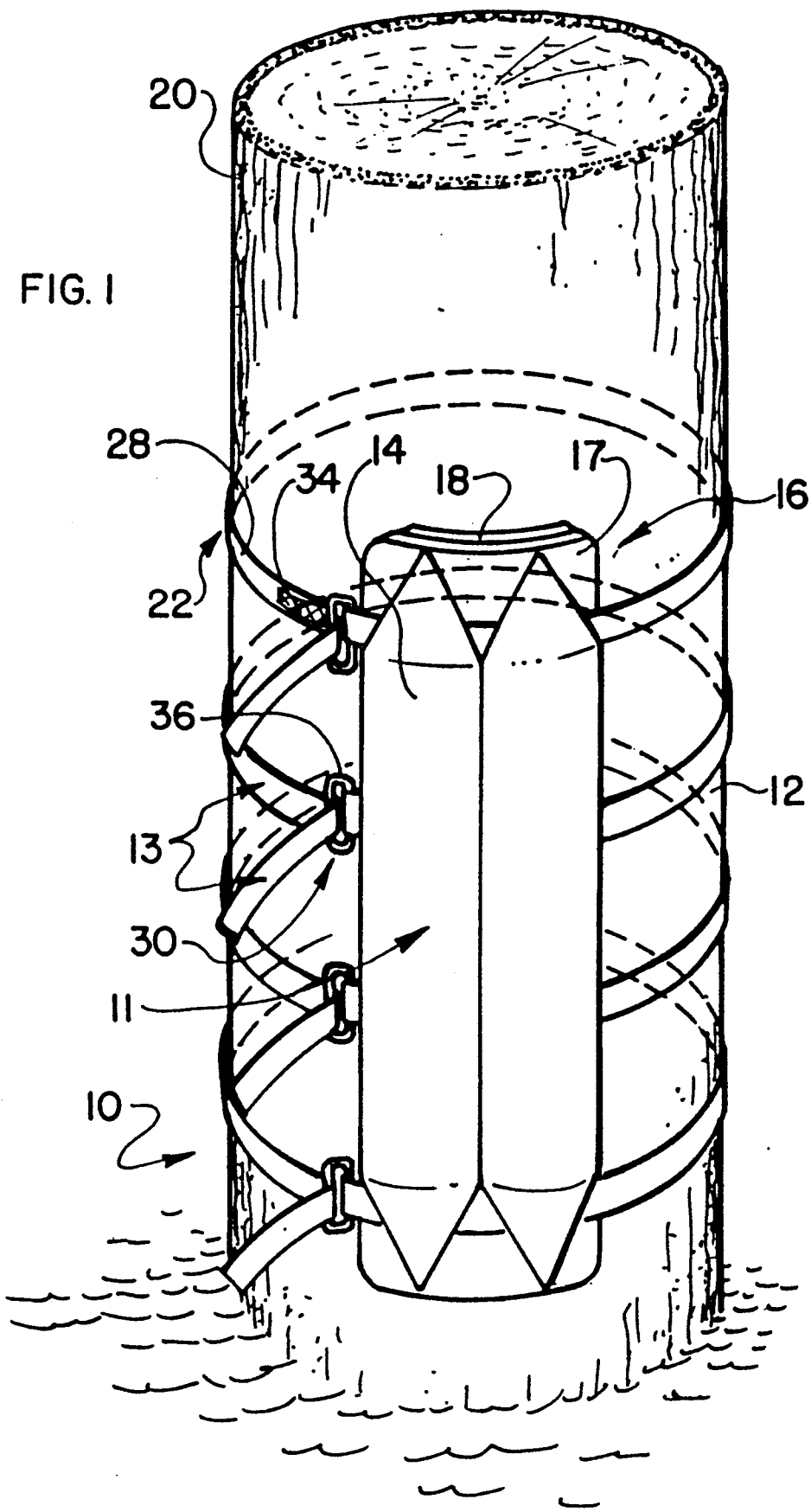
FIG. 1 is a perspective view of a marine fender according to one preferred embodiment of the present invention, shown it disposed on a piling of a marine structure.

Referring now to the accompanying drawings and initially to FIGS. 1 and 2, one preferred embodiment of the marine fender of the present invention is generally indicated at 10 and is shown in its installed position on a marine structure, such as an elongate piling 12. The marine fender 10 basically includes a fender body, generally indicated at 11, to which is attached a strap arrangement generally indicated at 13. The fender body 11 is formed by a plurality of elongate resilient bumper portions 14 commonly mounted side-by-side to one face of a flexible backing member 16. The opposite face of the backing member 16 forms a mounting surface 18 of the fender body 11 for frictionally engaging the outer surface 20 of the elongate piling 12 and the strap arrangement 13 includes a plurality of strap assemblies 22 which extend from opposite sides of the backing member 16 for encircling the elongate piling 12. The bumper portions 14 are formed of a material suitably resilient to deform when, for example, a boat or other marine vessel engages against the portions such as the result of marine wave action, in order to absorb the impact forces of the vessel and prevent direct contact between the elongate piling 12 and the boat which could scratch, mar or even structurally damage the vessel. Preferably, each elongate resilient portion 14 is a solid body of a high-density resilient plastic foam, formed for example by molding.

The backing member 16 includes a generally rectangular planar piece of rubber or vinyl coated nylon webbing 17, with a gum-rubber pad 19, bonded by glue or other adhesive means to one face of the backing member 16 to form its mounting surface 18. The pad 19 preferably has a stippled or other roughened or frictional surface character at the exposed face thereof in order to engage the outer surface 20 of the elongate piling 12 in a substantially non-slipping manner.

Each strap assembly 22 includes a strap 28 of sufficient length to encircle the elongate piling 12 with a coupling device 30 at one or both ends for selectively joining the strap ends and controlling the extent of the strap which encircles the elongate piling 12 in order to tighten the strap assembly 22 thereabout. In the preferred embodiment, the coupling device 30 is in the form of matable strips of releasable fastening material 32,34, such as, for example, the type commercially sold under the trademark VELCRO, each strap 28 having one mating strip 32 being affixed along an extent of the strap adjacent one free end and the cooperating strip 34 being affixed adjacent thereto along a medial extent of the strap. A closed ring 36 is fastened to the other free end of the strap. Thus, to selectively adjust the extent of each strap 28 which encircles the elongate piling 12, the free end of the strap 28 with the releasable fastening strip 32 is fed through the closed ring 36 until the desired circumferential extent of the strap 28 has been reached and then the fastening strip 32 is brought into overlying relation to and pressed against the cooperating fastening strip 34 to maintain the strap 28 at the desired circumferential extent.

As seen in FIG. 3, each strap 28 is affixed to the backing member 16 at the exposed face of the webbing 17, preferably by sewing as indicated by stitching 38. The straps 28 are arranged in spaced parallel relation laterally across the backing member 16 with their closed rings 36 closely adjacent one longitudinal edge of the backing member 16. The close orientation of the closed loop members 36 to the fender body 11 facilitates the accessibility and use of these rings when securing the marine fender 10 to a piling or other marine structure since the relatively short extent of the overhang of the corresponding ends of the straps 28 beyond the backing 16 insures that the rings 36 cannot hang loosely from the fender body 11 or become entangled with one another.

Depending upon the circumstances in which the marine fender 10 is to be used, only one or two strap assemblies 22 could be sufficient to secure the fender to the elongate piling 12; however, as can be understood, the use of a plurality of the strap assemblies 22 is generally preferred since the longitudinal spacing of the straps 28 from each other helps to minimize lateral swiveling movement of the marine fender 10 with respect to the elongate piling 12 and to best insure against undesired slippage or movement of the fender along the piling 12. Further, the provision of multiple strap assemblies 22 permits the marine fender 10 to be securely disposed on pilings which are tapered or otherwise of an irregular cross-sectional shape. The straps 28 can be individually adjusted to firmly encircle their respective tapering portions of the piling.

Each of the bumper portions 14 have a semi-cylindrical shape merging with semi-conical portions at each longitudinal end of the bumper portions 14, with a substantially planar surface 26 along the rearward side of the bumper portion 14. The planar surfaces 26 of the bumper portions 14 are affixed to the exposed face of the webbing 17 of the backing member 16 by glue or other adhesive means, with the bumper portions 14 arranged in parallel side-by-side relation generally coextensive with the longitudinal extent of the backing member 16. As best seen in FIG. 4, each bumper portion 14 has a plurality of laterally extending, rectangularly shaped recesses 24 formed in its planar surface 26 at spacings therealong for receiving the strap assemblies 22 therein when the bumper portions 14 are mounted to the backing member 16. Of course, while the embodiment of the fender of the present invention as illustrated has only a pair of the bumper portions 14, it will be understood that any desired number of the bumper portions 14 may be provided as necessary or desirable.

The operation and use of the fender 10 may thus be understood. The fender 10 is preferably of a suitable size to be readily portable so that one or more of the fenders may be easily stowed on most any common ski boat, pleasure boat or similar small water craft. When the craft is to be docked at a pier, dock or a like structure, each fender 10 is then mounted to an adjacent piling of the structure at an elevation above the water line whereat the craft otherwise would contact the piling as a result of normal wave action. Specifically, mounting is easily accomplished by manually positioning the pad 19 of the backing member 16 of the fender 10 in facing surface contact with the piling and extending the straps 28 one-by-one about the piling, looping each strap through its associated ring 36, and securing the mating strips 32,34 of each strap together. Each strap 28 is to be tightened as securely as possible about the piling to best resist any slippage of the fender 10. In doing so, the fender body 11 is caused to conform to the cross-sectional shape of the piling to allow better securement of the fender as well as to optimize its cushioning capability. Specifically, the flexible nature of the backing member 16 allows it to bend in its lateral extent and, at the same time, the lengthwise juxtaposed sides of the bumper portions 14 define a bending axis A so that the bumper portions 14 are a minimal restriction to the lateral bendability of the fender 10.

An alternate embodiment of a marine fender according to the present invention is shown in FIG. 6, wherein a lengthwise portion of each strap 28 of the several strap assemblies 22 is bonded within the body of each bumper portion 14 by molding the bumper portions about the straps 28. The frictional pad 19 may then be adhered directly to the bumper portions 14, eliminating any need for the webbing 17 of the first-described embodiment.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A portable marine fender adapted to repeatedly be selectively affixed to and removed from an elongate piling of a marine structure for protecting marine vessels and the piling from damaging contact with one another, said fender comprising:

an elongate fender body having a greater longitudinal than lateral extent, said fender body including an elongate bumper portion extending in the longitudinal extent of said body at one side of said body, said bumper portion being of sufficient resiliency to cushion normal impact of a marine vessel with a piling as a result of marine wave action, and said fender body including a mounting surface at the opposite side of said body of sufficiently frictional character with respect to a piling for generally non-slipping engagement therewith, said body being sufficiently manipulable in its lateral extent transversely of its longitudinal extent to be generally conformable to the cross-sectional shape of a piling; and selectively engageable and disengageable strap means extending laterally from said fender body for encircling a piling for selectively securing said body to a piling with the elongate extents of said body and the piling generally parallel and with said mounting surface held in frictional facing contact against the piling.

2. A marine fender according to claim 1 and characterized further by a plurality of bumper portions disposed in substantially side by side relation to one another.

3. A marine fender according to claim 2 and characterized further in that said fender body is bendable about an axis generally parallel to the longitudinal extent thereof.

4. A marine fender according to claim 3 and characterized further in that said axis corresponds to the area defined between a respective adjacent pair of said bumper portions.

5. A marine fender according to claim 1 and characterized further in that said strap means includes a plurality of strap assemblies each having a strap of sufficient length to encircle the piling.

6. A marine fender according to claim 5 and characterized further in that said strap assemblies are longitudinally spaced from, and generally parallel to, one another.

7. A marine fender according to claim 1 and characterized further in that said bumper portion includes a semi-cylindrical portion.

8. A marine fender according to claim 5 and characterized further in that said straps are secured to said bumper portion.

9. A marine fender according to claim 1 and characterized further in that said fender body includes a backing member having said bumper portion mounted to one side thereof and the opposite side thereof forming said mounting surface.

10. A marine fender according to claim 9 and characterized further in that said strap means are secured to said backing member.

* * * * *